United States Patent [19]

Hyde

[11] E Re. 28,981

[45] Reissued Sept. 28, 1976

[54] REFRACTORY SHAPES AND JAMB STRUCTURE OF COKE OVEN BATTERY HEATING WALL

[75] Inventor: Jack Hyde, Pittsburgh, Pa.

[73] Assignee: Koppers Company, Inc., Pittsburgh, Pa.

[22] Filed: Dec. 3, 1975

[21] Appl. No.: 637,156

Related U.S. Patent Documents

Reissue of:

[64] Patent No.: 3,878,053
Issued: Apr. 15, 1975
Appl. No.: 394,301
Filed: Sept. 4, 1973

[52] U.S. Cl. ..... 202/223; 52/570; 202/138; 202/139; 202/222; 202/267 R

[51] Int. Cl.[2] ..... C10B 1/00; C10B 1/06; C10B 29/00

[58] Field of Search ..... 202/268, 267, 269, 248, 202/247, 242, 138, 139, 140, 141, 142, 143, 144, 222, 223; 52/570, 572

[56] References Cited

UNITED STATES PATENTS

| | | | |
|---|---|---|---|
| 1,430,027 | 9/1922 | Plantinga | 202/267 |
| 1,666,284 | 4/1928 | Gilchrist | 52/570 |
| 3,214,353 | 10/1965 | Beimann | 202/139 |
| 3,553,083 | 1/1971 | Yacker et al. | 202/267 |

*Primary Examiner*—Joseph Scovronek
*Attorney, Agent, or Firm*—Sherman H. Barber; Oscar B. Brumback

[57] ABSTRACT

Novel shapes of refractory jamb bricks are disclosed which are readily removable and replaceable without tearing down and rebuilding the novel jamb structure of a heating wall of a coke oven battery.

15 Claims, 12 Drawing Figures

REFRACTORY SHAPES AND JAMB STRUCTURE OF COKE OVEN BATTERY HEATING WALL

Matter enclosed in heavy brackets [ ] appears in the original patent but forms no part of this reissue specification; matter printed in italics indicates the additions made by reissue.

BACKGROUND OF THE INVENTION

This invention relates to coke oven batteries and, more particularly, to a novel jamb structure at the ends of the heating walls of such battery.

In a coke oven battery the end jamb brick arrangement, which includes the bricks at the extreme ends of the coking chambers and the bricks at the outer ends of the heating wall end flues, are the portions of the heating wall that are subject to the most wear and tear, and that have to be replaced most often.

The end jamb bricks are exposed to the heat of the oven during coking and to the ambient temperature and weather conditions each time the coking chamber doors are removed for pushing coke. Sooner or later these end jamb bricks spall under such conditions, and crack and then must be replaced.

To be satisfactory, an end jamb brick must admit of easy removal and replacement without disturbing the other jamb bricks which are under compressive stress by the buckstays. Further, the jamb brick should be readily removable and replaceable without exposing any of the heating flues to ambient conditions, particularly the end flues.

Not all design of jamb bricks that are said to be easily and readily removable and replaceable, have proven to be satisfactory in service. It has been found that in some instances, the door jamb casting structure must be removed before the jamb bricks can be removed and replaced. Such a situation, those skilled in the art will recognize, is not satisfactory. Further, in some such instances, the mortar in the horizontal joints between bricks is pushed out in service and the maintenance of these joints has been both costly and time consuming. Such work must be carried on continually.

Those skilled in the art, from the following description, will recognize that each individual jamb brick of the present invention can be removed and replaced readily and quickly, without involving the door jamb casting. No alterations to adjacent bricks are required in order to accomplish this purpose.

For a further understanding of the invention and for features and advantages thereof, reference may be made to the following description and the drawing which illustrates preferred embodiments of refractory shapes in accordance with the invention.

DETAILED DESCRIPTION

Figure 1:
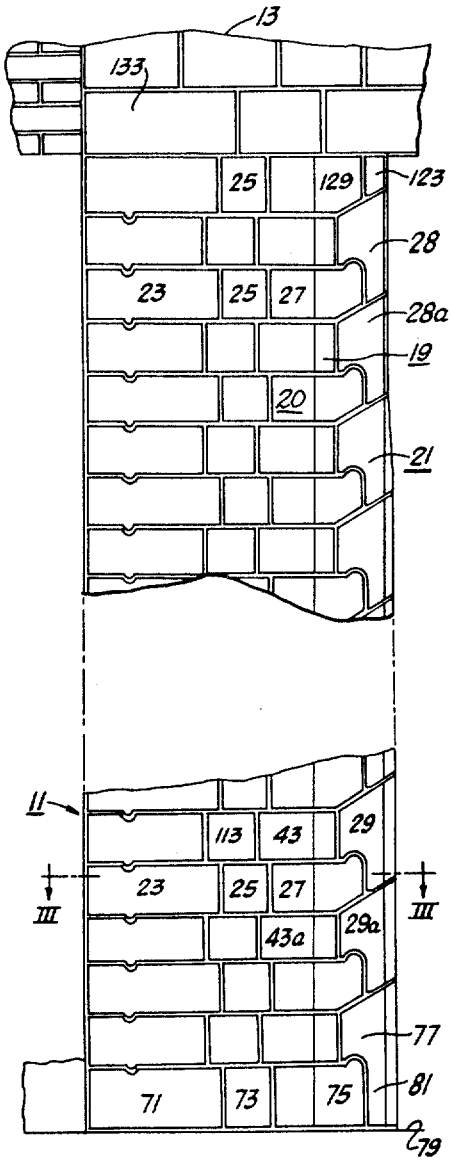
FIG. 1 is a vertical face view of the jamb structure of a heating wall located at one end of a coke oven battery.
Figure 2:
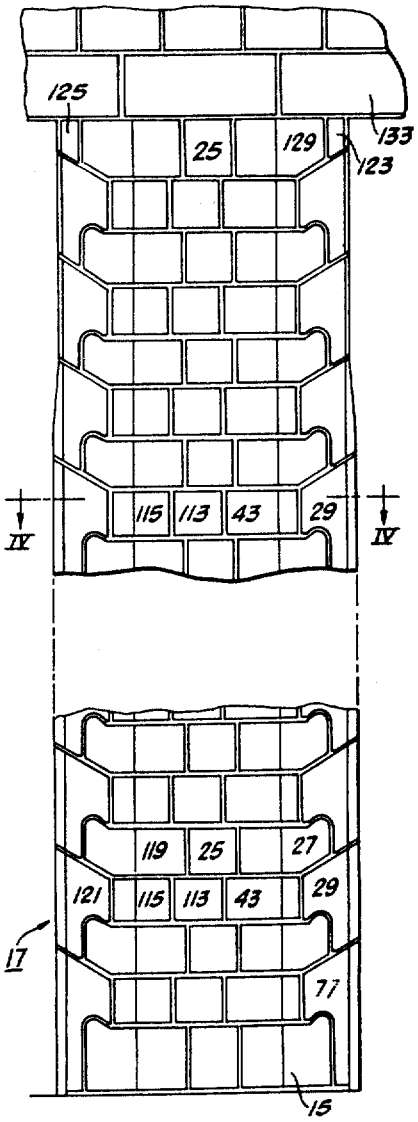
FIG. 2 is a vertical face view of the jamb structure, of a heating wall of such coke oven battery.

FIG. 1 illustrates the face view of the end wall jamb structure 11 of a coke oven battery 13, and FIG. 2 illustrates the face view of the jamb structure 15 of a typical intermediary heating wall 17.

Figure 3:
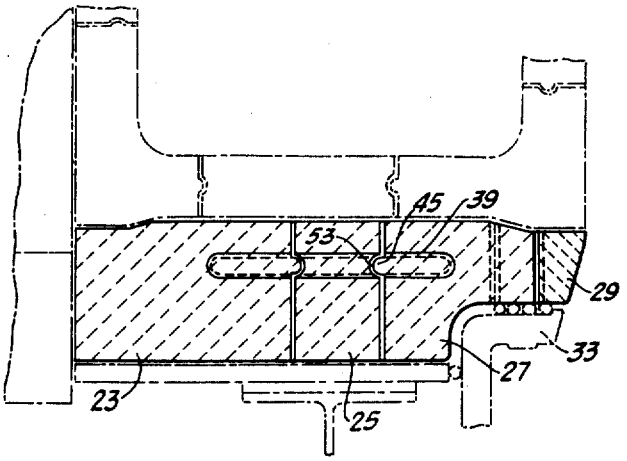
FIG. 3 is a view along line III — III of FIG. 1.

The jamb structure 11 includes a plurality of alternate courses 19, 20 of interdigitating refractory brick shapes, and there are, generally, three complete, whole brick shapes 23, 25, 27, and a portion of a fourth brick shape 29 in each horizontal course, as shown in FIG. 3. The whole brick shapes 23, 25 are of substantially conventional form, but the refractory brick shapes 27, 29 have novel forms as described herein and as shown in the drawings.

Figure 10:
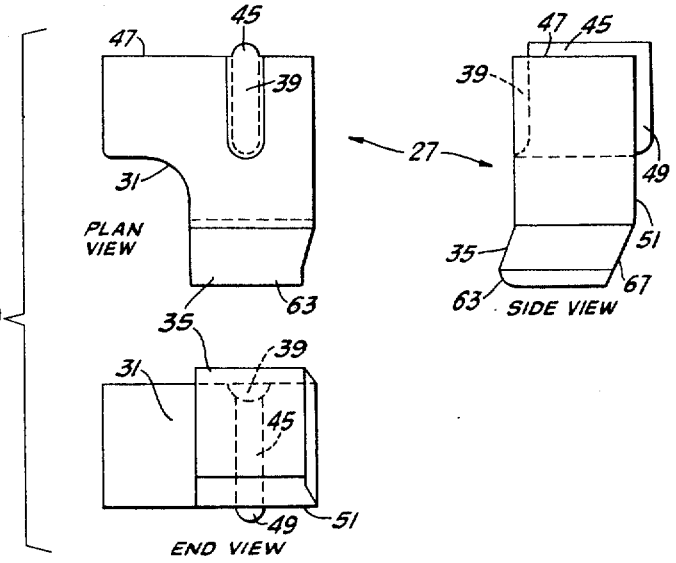

The refractory brick shape 27, which interdigitates with two adjacent refractory bricks 29, 29a has the form shown in FIG. 10. The refractory shape 27 is characterized in a top or plan view (corresponding to the view shown in FIG. 3) as having an L-form with a large radium sweep-portion 31 that is designed to fit around a conventional door jamb 33. The top surface of the shape 27 has an upwardly inclined portion 35 that cooperates with a radius portion [37] *61* of brick shape 29, shown in FIG. [8] *6*. The top surface of shape 27 also has a groove 39, which is shaped to coact with a tongue 41 on the bottom surface of refractory shape 43 that is shown in FIG. 13. The refractory shape 27 also has a tongue 45 on a vertical surface 47, and a tongue 49 on the bottom surface 51, which tongues 45, 49 cooperate with grooves 53 and 55 in refractory shapes 25 and 43a respectively, the shape 43a being located in the next lower adjacent horizontal course.

Figure 6:
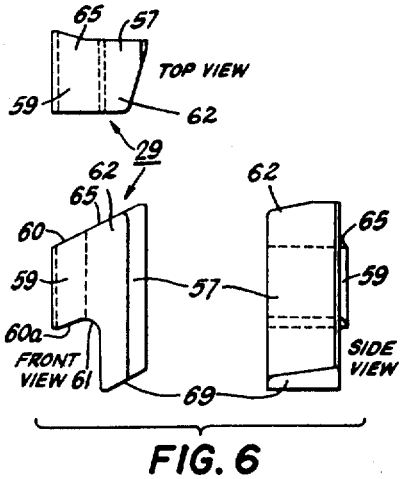

It will be noted from FIG. 1 that the shape 27 coacts with the lower portion of shape 29 and with the upper portion of shape 29a, which is substantially identical to shape 29. Refractory shape 29 (also 29a) is shown in FIG. 6 and it is characterized as having a generally rectangular body portion 57 from the top portion of which an outwardly and downwardly extending portion 59 projects. The outwardly and downwardly extending portion 59, having parallel top and bottom sloping surfaces 60, 60a, merges with the vertical body portion in a radius 61 that cooperates with a rounded portion 63 of the refractory shape 27, shown in FIG. 10.

The top surface 65 of shape 29 includes a surface 60 of the portion 59 and a surface 62 of the vertical body portion 57. Such sloping top surface 65 cooperates with surface 65a of refractory shape 29a in the horizontal course of bricks immediately below, as shown in FIG. 1.

The refractory shape 29 has a sloping bottom surface 69 that is generally parallel to the top surface 65 and to the sloping surface 60a. Thus, there are three parallel sloping planar surfaces 60a, 65, 69, of shape 29 and each one of these surfaces cooperates with a sloping planar surface of adjacent jamb bricks.

Figure 8:
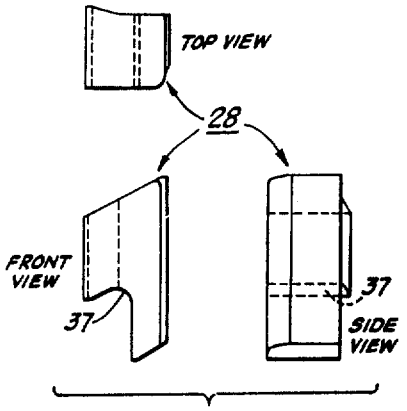

*FIG. 8 illustrates a refractory brick 28 (and also an identical brick 28a) that is substantially similar to the refractory brick 29 except that the brick 28 (and 28a) is*

*somewhat more rectangular in shape, as seen in the top view.*

*The refractory bricks 28 (and 28a) are installed in the top portion of the end wall jamb structure 11 where shown in FIGS. 1 and 2.*

The lowermost horizontal course of refractory shapes (FIG. 1) comprises three whole refractory bricks 71, 73, 75 and the lower portion of refractory brick 77. The refractory bricks 71, 73, 75 are substantially like refractory bricks 23, 25, 27 except that bricks 71, 73, 75 are slightly taller and they have no bottom tongues, like the tongue 49 of brick 27. The bricks 71, 73 and particularly brick 75, have planar, flat bottoms that rest upon the flat oven floor 79.

Figure 5:
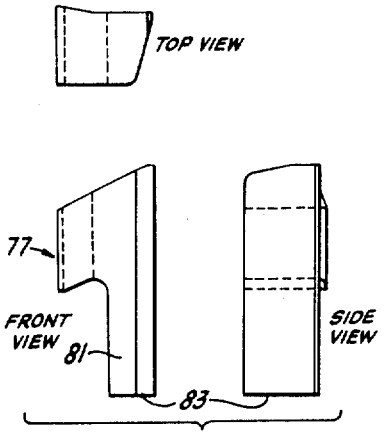
FIGS. 5–9 are refractory shapes in accordance with my invention that are used in the jamb structure of FIGS. 1 and 2.

The refractory brick 77, shown in FIG. 5, is substantially like refractory brick 29 (FIG. 6) except that brick 77 has a slightly longer lower portion 81, and it has a flat bottom surface 83 in contact with the flat oven floor 79. The other portions of refractory brick 77 (FIG. 5) are substantially like the same portions of refractory brick 29 shown in FIG. 6 and decribed herein.

Figure 7:
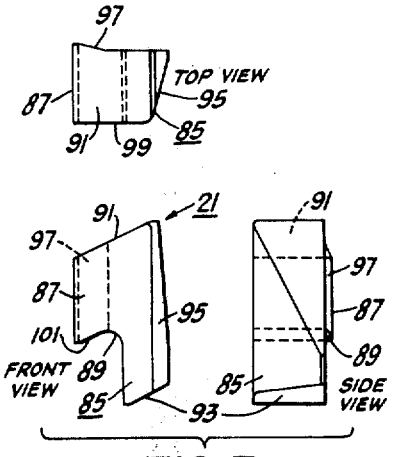

Refractory brick 21 is shown in detail in FIG. 7 and it comprises a substantially vertical portion 85, and a downwardly and outwardly extending side portion 87 that merges with the vertical portion in a radius 89. The top surface portions 91 of the vertical and side portions 85, 87 from a single planar surface that slopes downward in the same manner as surface 65 of refractory shape 29 (FIG. 6). The bottom surface portions 93 of the vertical portion 85 slopes in a generally parallel relation to the top surface 91. The right-hand vertical surface 95 of vertical portion 85 (as viewed in FIG. 7, front view) is disposed askew to the opposite vertical surface portion 97 of the vertical portion 85, as shown in FIG. 7. Likewise, one surface portion 97 of the side portion 87 is askew with respect to the opposite side portion 99, as shown in FIG. 7. Refractory shape 21, like refractory shape 29, has three parallel plane surfaces 91, 93 and 101, surface 101 being the bottom surface of portion 87.

Figure 12:
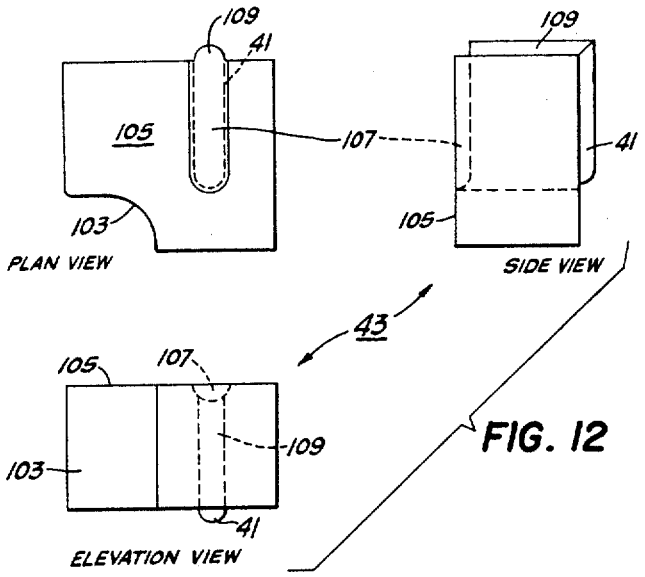

Refractory shape 43 is shown in detail in FIG. 12 and, it will be noticed, it is similar to shape 27 but for the inclined portion 35 of shape 27. Shape 43 is generally rectangular in plan view with the lower left corner portion 103 formed in an arcuate manner as shown. The top surface 105 has an elongate groove 107 therein, where shown. Directly beneath such groove 107 there is a tongue portion 41 which, as mentioned herein before, coacts with the groove 39 in refractory shape 27. A vertically arranged tongue 109 is disposed on a vertical side of shape 43, where shown, and this tongue coacts with a vertical groove 111 in adjacent refractory shape 113 (FIG. 4).

Figure 4:
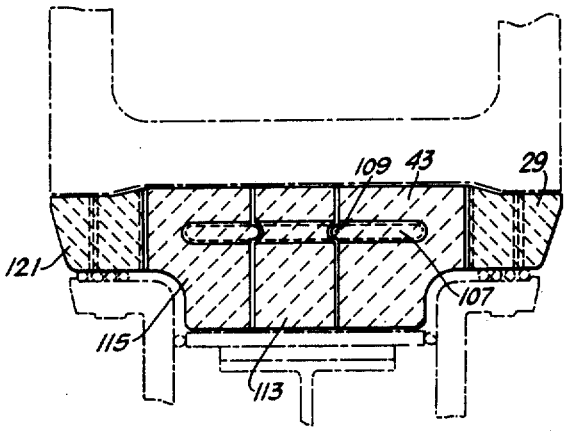
FIG. 4 is a view along line IV — IV of FIG. 2.

Referring to FIG. 4, refractory shape 115 is substantially the same as refractory 43 except to the opposite hand.

Referring to FIG. 2, refractory shapes 117, 119 and 121 are respectively like shapes 43, 27 and 29 respectively, but to the opposite hand.

Figure 9:
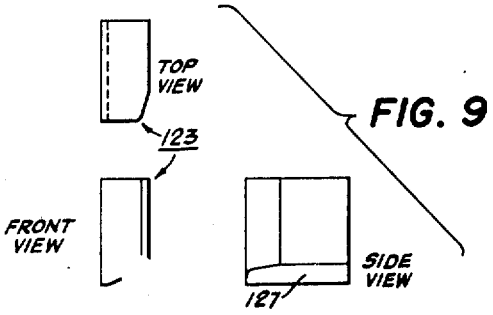

FIG. 9 illustrates a small refractory shape 123 that is located at the top of the jamb structure (FIG. 1). In FIG. 2, refractory shape 125 is similar to shape 123, but to the opposite hand. Shape 123, as shown, is generally rectangular, but has a sloping bottom surface 127 that cooperates with sloping surface 65 of shape 29 in the next lower course of bricks.

Figure 11:
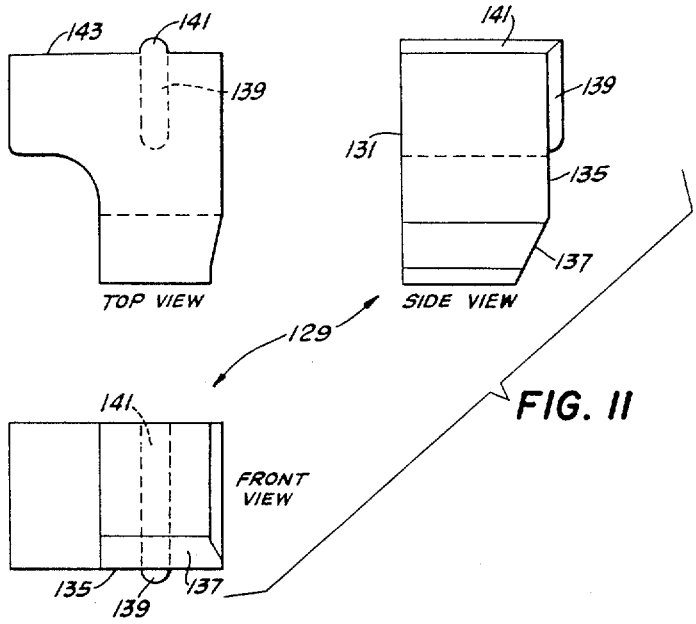
FIGS. 10 – 12 are other refractory shapes in accordance with my invention that are used in the jamb structure of FIGS. 1 and 2.

FIG. 11 illustrates refractory shape 129 which is similar to shape 27. Shape 129, however, has a flat planar top 131 that coacts with the oven roof brickwork 133. The bottom surface of shape 131 is planar and parallel to the top surface 131 in one portion 135 and is sloped upwardly in another portion 137 so as to cooperate parallely to surface 35 of shape 27 immediately therebelow in the next lower course of jamb bricks.

The bottom surface portion 135 is provided with a tongue 139 that coacts with groove 39 of shape 27. A vertical tongue 141 is provided on surface 143, which tongue coacts with groove 53 in refractory brick shape 25.

Thus, substantially all of the novel refractory brick shapes of the present invention have been described and are shown.

From the foregoing description of the several embodiments of the invention, those skilled in the art should recognize many important features and advantages of it, among which the following are particularly significant:

That each refractory shape comprising the jamb bricks can be individually removed and replaced on both the pusher and the coke sides without disturbing the door jamb castings, without making any field alterations, and without damaging any adjacent bricks in the end wall structure;

That the sloping surfaces of the novel jamb shapes increases the stability of the mortar in the joints between adjacent bricks; and That the center of gravity of the novel jamb shapes having the outwardly and downwardly projecting portion is below and toward such projecting section. Wherefore, such jamb shapes tend to "lean" towards the flue wall and this tends to keep all of the vertical joints tight.

Although the invention has been described herein with a certain degree of particularity it is understood that the present disclosure has been made only as an example and that the scope of the invention is defined by what is hereinafter claimed.

What is claimed is:

1. In a coke oven battery having heating walls with vertical flues therein, a jamb structure at the ends of each heating wall comprised of horizontal courses of refractory brick shapes comprising:

a. a plurality of vertically arranged adjacent interdigitating refractory jamb shapes with each shape having top and bottom parallel planar sloping surfaces coacting with adjacent jamb and intermediary end wall refractory shapes.

2. The invention of claim 1 wherein:

a. bottom jamb brick shapes of said heating wall having flat planar bottoms that rest upon a floor of said coke oven battery.

3. The invention of claim 2 wherein:

a. topmost jamb brick shapes of said heating wall have a flat planar top that is coplanar with a top surface of said heating walls.

4. In a coke oven battery having heating walls with vertical flues therein, a jamb structure at the ends of each heating wall comprised of horizontal courses of refractory brick shapes comprising:

a. interdigitating end jamb brick shapes of said wall structure so constructed and arranged that said jamb bricks tend to lean toward the heating flue of which they are wall elements.

5. In a coke oven battery having heating walls with vertical flues therein, a jamb structure at the ends of each heating wall comprised of horizontal courses of refractory brick shapes comprising:

a. two spaced apart end jamb shapes with the outer surface of each such shape comprising a portion of such heating wall surface and with each such jamb shape having top and bottom planar parallel sloping surfaces, with b. said bottom sloping surface of each jamb brick being coplanar with an upwardly sloping bottom surface portion of an intermediary refractory brick shape disposed adjacent to each one of the two spaced apart end jamb shapes.

6. The invention of claim 5 wherein:

a. each intermediary refractory brick shape has a top surface portion that is parallel to the top surface of the adjacent end jamb shape and that is cooperative with a planar surface that is parallel to the top and bottom parallel sloping surfaces of said end jamb shape.

7. The invention of claim 6 including:

a. a third refractory brick shape disposed between the two intermediary refractory shapes adjacent said pair of end jamb shapes, and having tongue and groove features that coact with groove and tongue features of said two intermediary refractory shapes.

8. A coke oven jamb structure refractory brick shape as shown in FIG. 5.

9. A coke oven jamb structure refractory brick shape as shown in FIG. 6.

10. A coke oven jamb structure refractory brick shape as shown in FIG. 7.

11. A coke oven jamb structure refractory brick shape as shown in FIG. 8.

12. A coke oven jamb structure refractory brick shape as shown in FIG. 9.

13. A coke oven jamb structure refractory brick shape as shown in FIG. 10.

14. A coke oven jamb structure refractory brick shape as shown in FIG. 11.

15. A coke oven jamb structure refractory brick shape as shown in FIG. 12.

* * * * *